United States Patent
Stoller

(10) Patent No.: US 10,564,678 B2
(45) Date of Patent: Feb. 18, 2020

(54) DISPLAY SCREEN AND DISPLAY LENS OF ELECTRONIC DEVICE

(71) Applicant: Motorola Mobility LLC, Chicago, IL (US)

(72) Inventor: Wesley A. Stoller, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 584 days.

(21) Appl. No.: 14/923,429

(22) Filed: Oct. 26, 2015

(65) Prior Publication Data
US 2017/0115702 A1    Apr. 27, 2017

(51) Int. Cl.
  G06F 1/16       (2006.01)
  G02F 1/1333   (2006.01)
  H04M 1/02     (2006.01)
  G06F 3/041    (2006.01)
  H04M 1/18     (2006.01)

(52) U.S. Cl.
  CPC ...... *G06F 1/1656* (2013.01); *G02F 1/133308* (2013.01); *G06F 1/1652* (2013.01); *G06F 3/041* (2013.01); *H04M 1/0268* (2013.01); *G02F 2001/133331* (2013.01); *G06F 2203/04102* (2013.01); *H04M 1/185* (2013.01)

(58) Field of Classification Search
  CPC ... G02F 1/133308; G02F 2001/133331; G06F 1/1652; G06F 1/1656; G06F 2203/04102; G06F 3/041; H04M 1/0268; H04M 1/185
  See application file for complete search history.

(56) References Cited

U.S. PATENT DOCUMENTS

| 3,177,273 A * | 4/1965 | Fingerhut | E04F 13/0862 264/511 |
| 2002/0025441 A1 * | 2/2002 | Hieda | B32B 17/10018 428/440 |
| 2003/0016317 A1 * | 1/2003 | Kotchick | G02F 1/133528 349/96 |
| 2007/0000764 A1 * | 1/2007 | Bellows | H04M 1/0266 200/310 |
| 2008/0086925 A1 * | 4/2008 | Yang | H04M 1/0268 40/610 |
| 2009/0146970 A1 * | 6/2009 | Lowles | G06F 3/044 345/174 |
| 2013/0045371 A1 * | 2/2013 | O'Donnell | C09J 7/0296 428/215 |
| 2013/0108806 A1 | 5/2013 | Han et al. | |

(Continued)

FOREIGN PATENT DOCUMENTS

CN    203007199 U    6/2013
EP        2180367 A1    4/2010

(Continued)

OTHER PUBLICATIONS

Search Report for related European Application No. EP16195119.9; report dated Mar. 7, 2017.

*Primary Examiner* — Sophie Hon
*Assistant Examiner* — Sow Fun Hon
(74) *Attorney, Agent, or Firm* — McKinney Phillips LLC; Phillip Pippenger

(57) ABSTRACT

There is described an electronic device comprising a durable display screen, and a shatterproof or plastic display lens adjacent to the durable display screen.

7 Claims, 4 Drawing Sheets

(56) References Cited

U.S. PATENT DOCUMENTS

| | | | | |
|---|---|---|---|---|
| 2014/0002385 A1* | 1/2014 | Ka | ........................ | G06F 1/1601 |
| | | | | 345/173 |
| 2014/0170391 A1 | 6/2014 | Hongo et al. | | |
| 2014/0332417 A1* | 11/2014 | Wicks | .................. | H04B 1/3888 |
| | | | | 206/37 |
| 2014/0355227 A1* | 12/2014 | Lim | ........................ | H05K 1/028 |
| | | | | 361/749 |
| 2015/0207102 A1 | 7/2015 | Jeong et al. | | |

FOREIGN PATENT DOCUMENTS

| | | |
|---|---|---|
| EP | 2230547 A1 | 9/2010 |
| EP | 2535792 A1 | 12/2012 |

\* cited by examiner

DISPLAY SCREEN AND DISPLAY LENS OF ELECTRONIC DEVICE

TECHNICAL FIELD

The present disclosure is related generally to user interface technologies for electronic devices, and, more particularly, to a device having a durable display screen and shatterproof display lens for an electronic device.

BACKGROUND

Many portable communications devices, e.g., smart phones and the like, have traditionally utilized glass lenses over the device display. The glass provides a hard, scratch-resistant surface that is easy to clean and maintain. However, such lenses are also easily cracked if the device is dropped or struck by a hard object.

While it is possible to use plastic lenses to eliminate or reduce this type of breakage, there are a number of drawbacks associated with the use of plastic lenses. One of the primary challenges for this type of lens is the lack of adequate scratch and abrasion resistance. Plastic materials do not have the same hardness as glass and therefore do not offer the same abrasion and damage resistance.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, glass lenses on portable communication devices are hard, resulting in scratch resistance, but brittle, resulting in breakage if the lens is struck.

In an embodiment of the disclosed principles, an electronic device comprises a durable display screen, such as a flexible display screen or a plastic display screen. Also, in the embodiment of the disclosed principles, the electronic device comprises a shatterproof display lens, such as a plastic display lens, adjacent to the durable display screen. A shatterproof display lens is used in conjunction with a durable display screen, essentially eliminating lens or display breakage from environmental events. For further protection or protection from scratches, a replaceable plastic screen protector may be used in conjunction with the lens and display.

With this overview in mind, and turning now to a more detailed discussion in conjunction with the attached figures, the techniques of the present disclosure are illustrated as being implemented in a suitable computing environment. The following generalized device description is based on embodiments and examples within which the disclosed principles may be implemented, and should not be taken as limiting the claims with regard to alternative embodiments that are not explicitly described herein. Thus, for example, while FIG. 1 illustrates an example electronic device within which embodiments of the disclosed principles may be implemented, it will be appreciated that other device types may be used, including but not limited to laptop computers, tablet computers, embedded automobile computing systems and so on.

Figure 1:
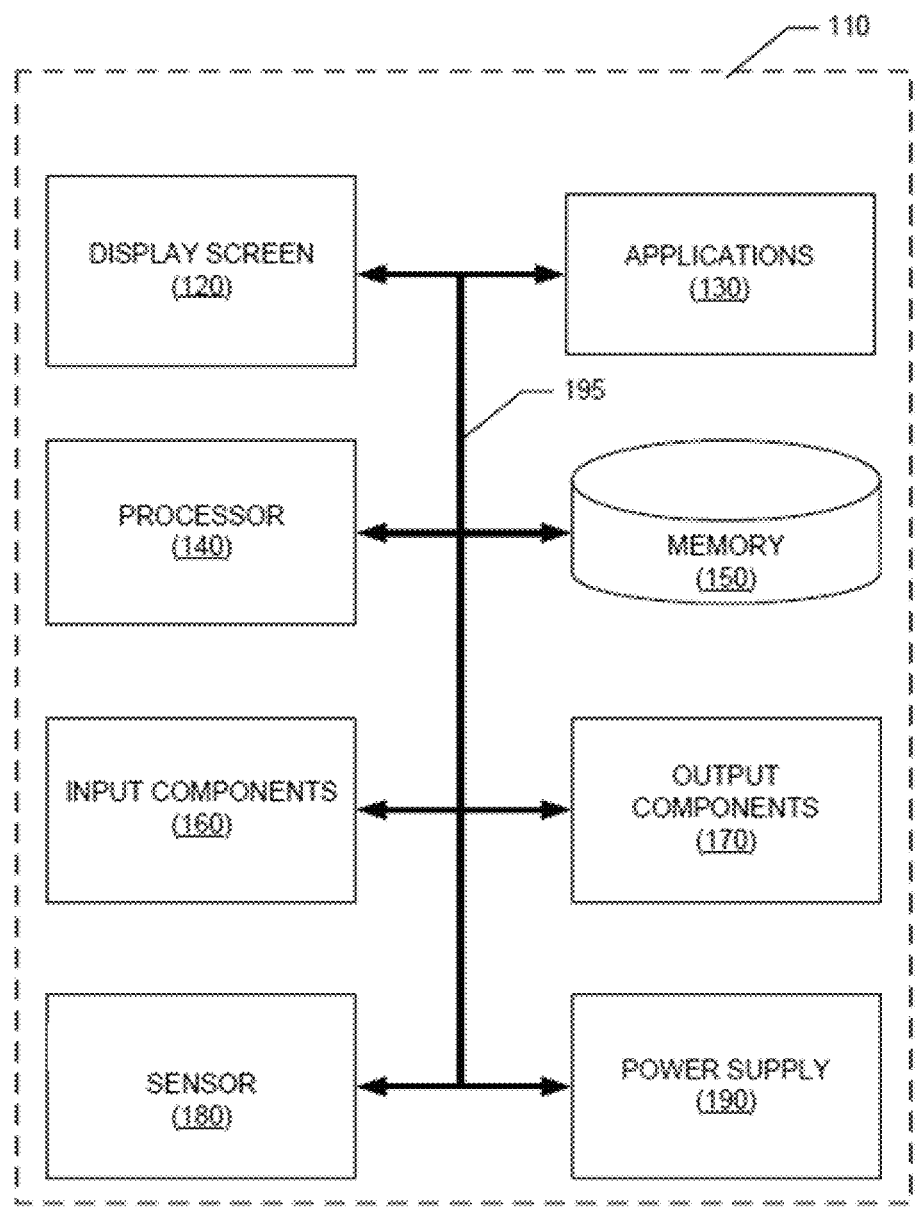
FIG. 1 is a simplified schematic of an example device with respect to which embodiments of the presently disclosed principles may be implemented.

The schematic diagram of FIG. 1 shows an example device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 may be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device 110 may also include one or more sensors 180 configured to provide a signal indicative of the presence or absence of a device condition. The device 110 may further include a power supply 190, such as a battery or fuel cell, for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications).

Figure 2:
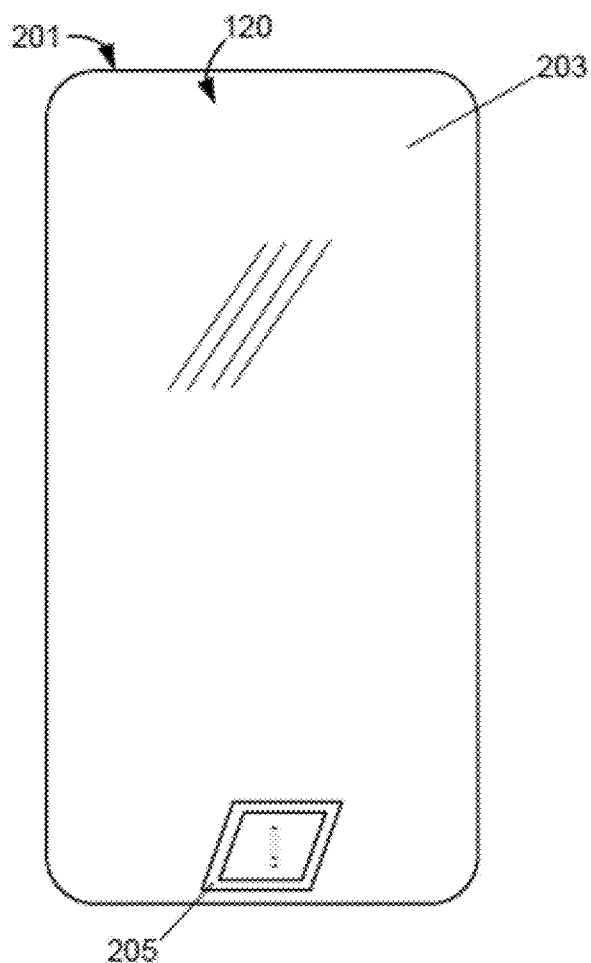
FIG. 2 is a front view of a device in accordance with an embodiment of the disclosed principles.

Turning to FIG. 2, this figure shows a front view of a device 201 in accordance with an embodiment of the disclosed principles. From the front, the appearance of the device 201 is dominated by the device display screen 120. As noted above, the screen may be made of, or comprise, plastic to avoid breakage. To protect the screen 120 from scratches and abrasion, a screen protector 203 is applied over the display screen 120 as in the illustrated embodiment. The screen protector 203 is substantially transparent, allowing the screen 120 to be viewed through the screen protector 203.

The screen protector 203 in the illustrated embodiment may include one or more apertures or indicators 205. The apertures or indicators 205 may be provided through a portion of the screen protector 203, by printed metallic ink, by an adhesive piece or other suitable design, and substantially joined to or into the screen protector 203. The precise shape and design of each aperture or indicator 205 is not important.

Figure 3:
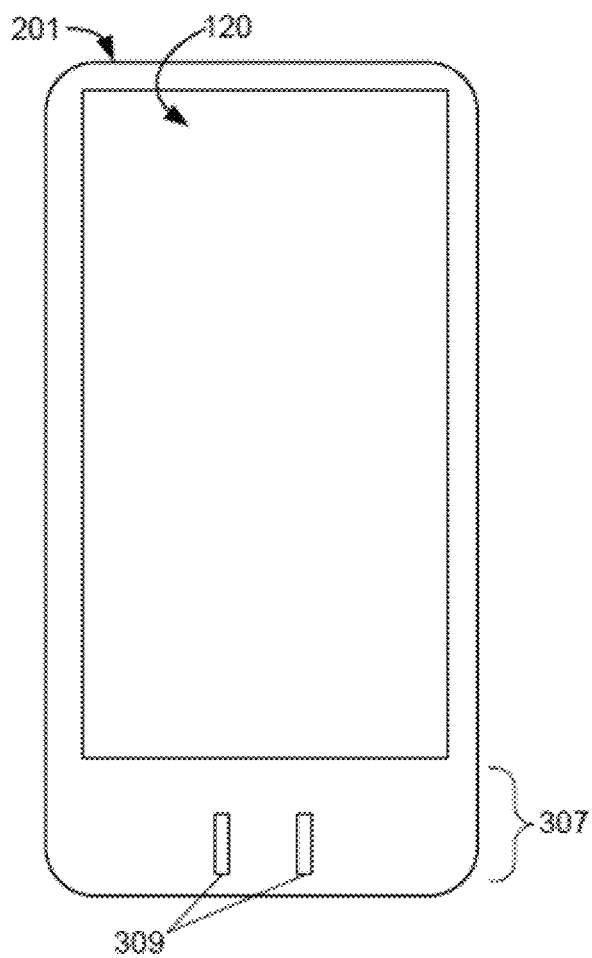
FIG. 3 is a simplified schematic of the face of a device in accordance with an embodiment of the disclosed principles including the device screen.

Turning to FIG. 3, this figure illustrates the underlying elements on the face of the device 201 in greater detail, i.e., beneath the screen protector 203. In particular, as can be seen, the active area of the screen 120 covers most but not all of the face of the device 201. For example, the face of the device 201 may include an area 307 outside of the screen 120, which may include various components 309 outside of the active area.

Figure 4:
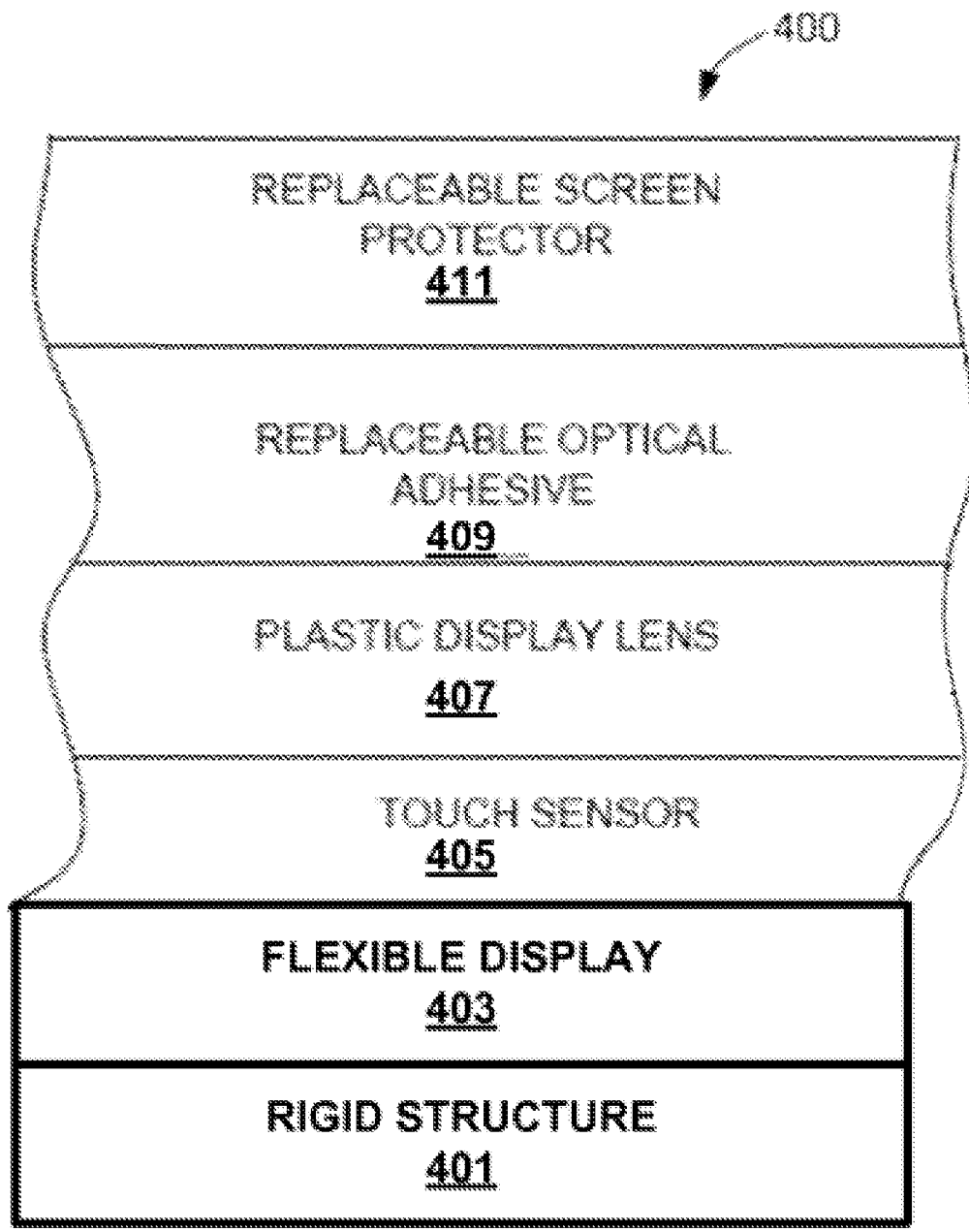
FIG. 4 is a cross-sectional layer diagram of a display screen assembly in accordance with an embodiment of the disclosed principles.

The relationship between the various lens and display components in a layered screen structure can be better seen in the partial cross-sectional view of FIG. 4. In particular, FIG. 4 shows a cross-section of a display screen assembly 400 in accordance with an embodiment of the disclosed principles. The illustrated cross-section is taken perpendicularly through the device screen region in a plane that cuts through the various layers of the device.

The display screen assembly 400 includes a core structure 401 for supporting the remainder of the display screen assembly. The core structure may be made of a wide variety of rigid, durable materials, such as high strength aluminum.

The display screen assembly 400 includes a durable display screen 403 made of durable materials that withstand abrasion and damage resistance. The durable display screen 405 may be a flexible display screen or a plastic display screen. An example of a flexible or plastic display screen includes, but is not limited to, a plastic OLED display (pOLED).

The display screen assembly 400 includes a touch sensor 405. For one embodiment, the touch sensor is a film that overlays the durable display screen 403. An example of a flexible or plastic display screen includes, but is not limited to, a dual touch layer.

The display screen assembly 400 includes a shatterproof display lens 407. The shatterproof display lens 407 is located adjacent to the durable display screen 403. For one embodiment, the shatterproof display lens 407 overlays the durable display screen 403. For another embodiment, the touch sensor 405 is located between the shatterproof display 407 lens and the durable display screen 403. For still another embodiment, the shatterproof display lens 407 is securely bonded to the shatterproof display 407 lens and/or the durable display screen 403.

The shatterproof display lens 407 includes a plastic layer. The plastic layer may include any type of durable and/or flexible materials. An example of the material used for the plastic player includes, but is not limited to, a polycarbonate layer. The shatterproof display lens 407 also includes an acrylate hardcoat on one side or both sides of the plastic layer.

The display screen assembly 400 includes a replaceable optical adhesive 409 and a replaceable screen protector 411. The replaceable screen protector 411 is positioned on a side of the shatterproof display lens opposite the durable display screen 403. The replaceable screen protector 411 may be any type of replaceable lens to protect the other components of the display screen assembly. An example of the replaceable screen protector 411 includes, but is not limited to, a layer having a scratch resistant nanocoating. The replaceable optical adhesive 409 is positioned between the replaceable screen protector 411 and the shatterproof display lens 407.

The display screen 120 is made up of a film touch sensor 401 covered by a plastic display lens 403. As noted above, while the plastic display lens 403 is more resistant to breakage than an equivalent glass lens, the plastic display lens 403 is more susceptible to scratching and abrasion. As such, a replaceable plastic screen protector such as plastic screen protector 203 is placed over the plastic display lens 403.

It will be appreciated that various systems and processes for screen protector detection have been disclosed herein, along with methods and configurations for enabling the use of plastic display lenses in electronic devices. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. An electronic device comprising:
   a display screen, wherein the display screen comprises a clear plastic material;
   a shatterproof display lens adjacent to the display screen; and
   a rigid structure underlying the display screen.

2. The electronic device of claim 1, wherein the shatterproof display lens overlays the display screen.

3. The electronic device of claim 1, wherein the display screen includes a touch sensor.

4. The electronic device of claim 1, wherein the shatterproof display lens includes a plastic layer.

5. The electronic device of claim 4, wherein the plastic layer includes a polycarbonate layer.

6. The electronic device of claim 4, wherein the shatterproof display lens includes an acrylate hardcoat on at least one side of the plastic layer.

7. The electronic device of claim 4, wherein the shatterproof display lens includes an acrylate hardcoat on both sides of the plastic layer.

* * * * *